United States Patent [19]

Morton

[11] Patent Number: 4,550,522

[45] Date of Patent: Nov. 5, 1985

[54] LIVE BAIT VENDING APPARATUS

[76] Inventor: Ted W. Morton, 7229 E. Shea Blvd., Scottsdale, Ariz. 85254

[21] Appl. No.: 637,136

[22] Filed: Aug. 2, 1984

[51] Int. Cl.[4] .......... A01K 97/04

[52] U.S. Cl. .......... 43/55; 194/2

[58] Field of Search .......... 43/55, 56, 57; 194/2, 194/79

[56] References Cited

U.S. PATENT DOCUMENTS

| | | | |
|---|---|---|---|
| 2,241,662 | 5/1941 | Garner | 221/82 |
| 2,767,507 | 10/1956 | Chiambretti | 43/55 |
| 2,860,444 | 11/1958 | McHugh | 43/56 |
| 2,908,105 | 10/1959 | Rogers | 43/55 |
| 2,920,735 | 1/1960 | Sims | 194/79 |
| 3,372,784 | 3/1968 | Ross et al. | 194/2 |
| 4,018,359 | 4/1977 | Lambert | 221/14 |
| 4,146,989 | 4/1979 | Vanus | 43/57 |

*Primary Examiner*—Gene P. Crosby

*Attorney, Agent, or Firm*—Warren F. B. Lindsley

[57] ABSTRACT

A money operated apparatus for vending aquatic fishing bait and water in which the bait is maintained is located in a carrousel having ring-shaped compartmentized tanks. Money operable motor means is provided for moving a compartment to an indexed position beneath an unlocked sliding window for removal of the viewed bait. Further, a tap is provided for removing in a timed controlled manner some of the water supply of the apparatus for use in the purchaser's minnow bucket.

5 Claims, 4 Drawing Figures

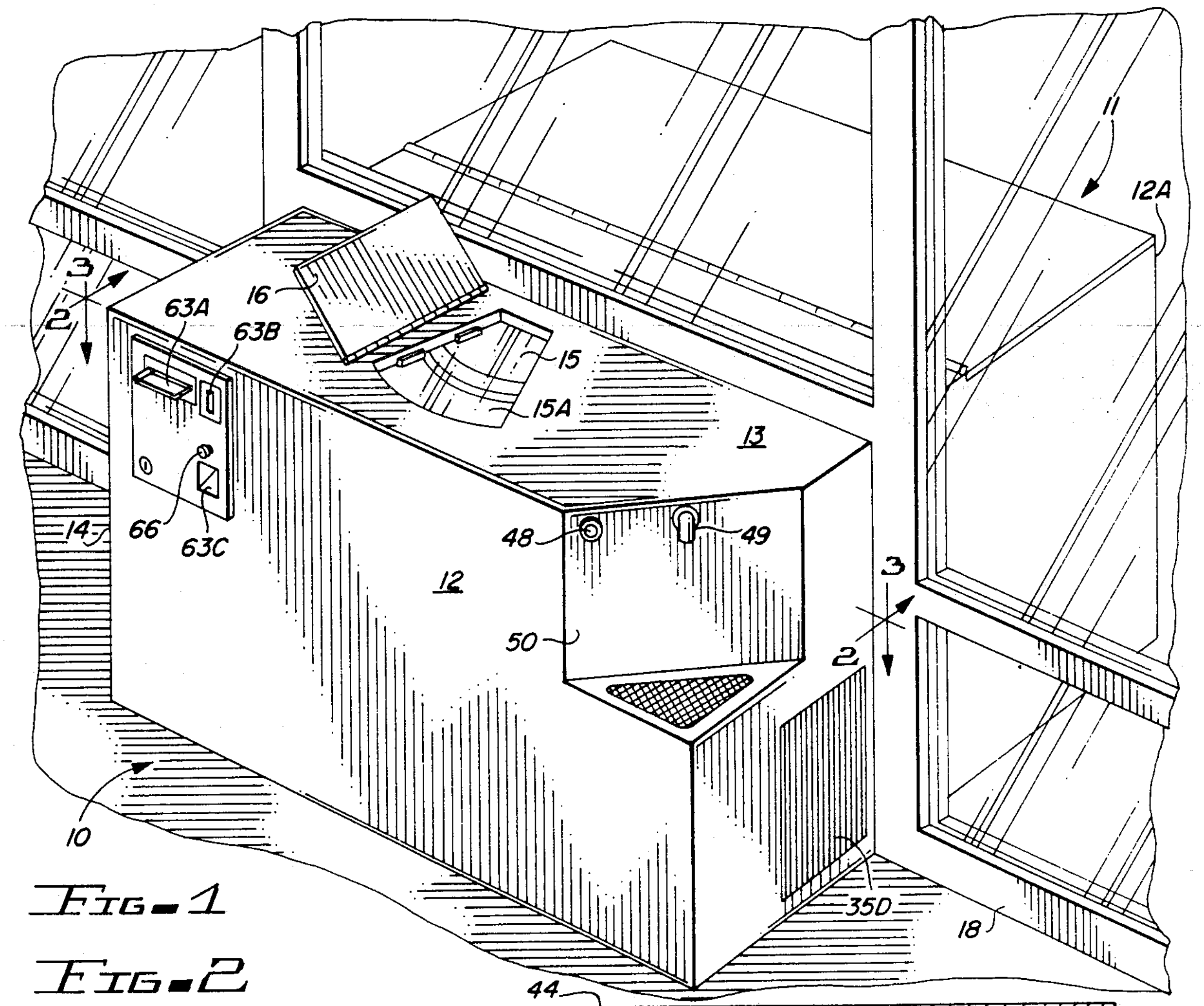
FIG-1
FIG-2
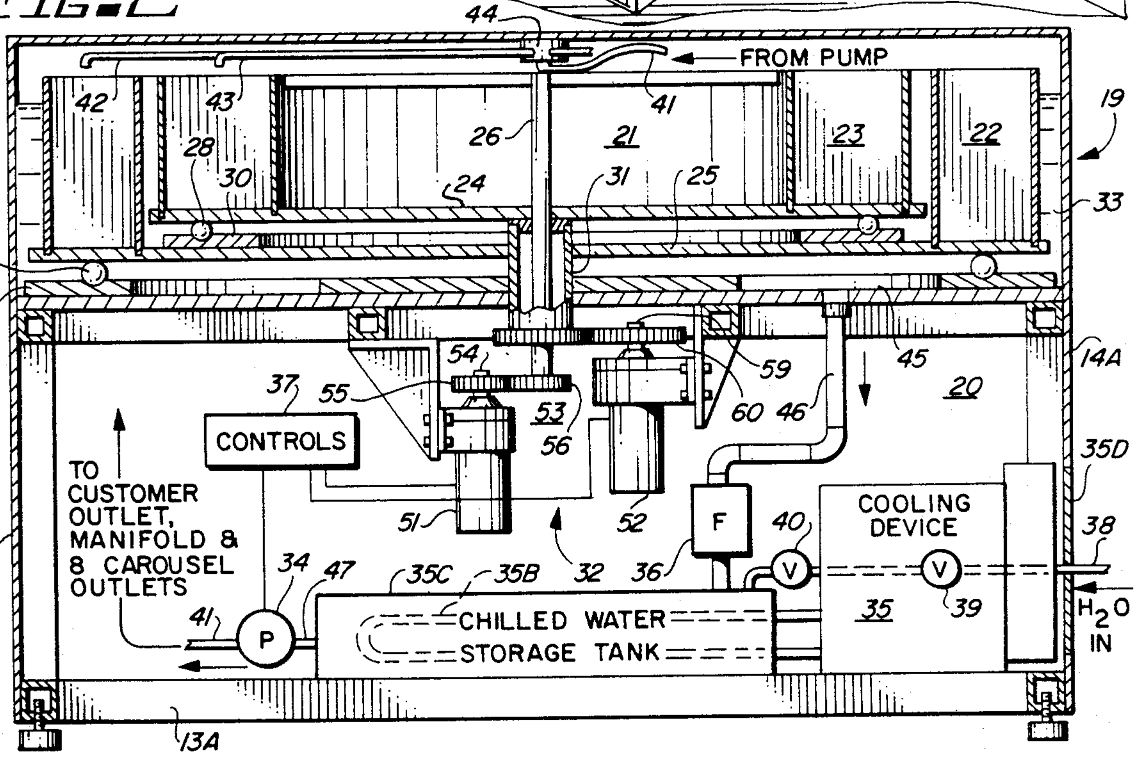

LIVE BAIT VENDING APPARATUS

BACKGROUND OF THE INVENTION

A large majority of fisherman who use minnows or other type of live bait, purchase the minnows from bait shops and marinas. Bait vendors frequently maintain minnows alive in large quantities in refrigerated and aerated tanks and dispense small measured quantities which necessitates the use of small nets to remove the proper quantity of minnows from the tanks to count and place them into the customer's minnow bucket. This procedure not only requires an attendant, but frequently results in annoying delays to the customer while waiting for the attendant to arrive and then collect and dispense the minnows. Also, some of the minnows are injured by the handling and soon die.

Various dispensing machines have been proposed, some coin operated, for assisting the attendant to more easily catch and count the minnows. Machines have been proposed to dispense a predetermined number of the minnows without the assistance of an attendant. However, most machines have been complex and involve a large amount of machinery to function.

Thus, a need exists for an apparatus that is simple, fast and efficient and whereby the operator may serve him or herself without assistance from an attendant whose attention is required only when the apparatus is empty.

THE PRIOR ART

U.S. Pat. No. 2,860,444 discloses an aerated minnow vendor for live fish bait in which containers for the minnows are partially submerged and mounted on an endless conveyor. The conveyor is moved into alignment with a dispensing opening of the machine in response to the depositing of a coin within a coin actuated operator.

U.S. Pat. No. 2,908,105 discloses a method and apparatus for dispensing live aquatic animals from a tank wherein the apparatus contains a plurality of connected dispensing units for containing the animals. Means are provided for moving the units in a predetermined order past a dispensing station for sequestial removing of the units from the tank.

U.S. Pat. No. 2,920,735 discloses a bait vending machine employing a tank adapted to contain a quantity of water and provided with a plurality of individually removable bait containers immersed in the water. The housing has a removable cover provided with an opening through which the containers may be individually removed by a step-by-step indexing of the cover.

U.S. Pat. No. 3,372,784 discloses a machine for vending a predetermined quantity of minnows from a bulk container having a primary receptacle for the minnows and a restricted outlet for dispensing the minnows. The minnows are concentrated adjacent the outlet and additional water is supplied to the primary receptacle from a secondary receptacle causing the water to overflow through the outlet carrying the minnows, essentially one at a time through the outlet. The quantity of minnows passing through the outlet is measured, either by counting or by volume and pass into a delivery receptacle which also contains a predetermined measure of water.

U.S. Pat. No. 4,018,359 discloses a live bait vending apparatus for vending sealed bags of bait by a helical-shaped conveyor which discharges the bags to a dispensing chute.

While such prior art inventions do suggest workable approaches for the realization of the important objectives involved, the particular implementations described in these patents have in general fallen short of what is required in a low-cost and practical system suitable for application and use by the typical purchaser.

SUMMARY OF THE INVENTION

In accordance with the invention claimed, an improved live bait dispensing machine and method of operation is disclosed in which the prospective customer may view the bait before purchase through a window in the top of the machine and then insert legal tender to purchase them if he or she so desires. Bait water is dispensable from the tank in which the bait is stored in order to maintain water temperature conditions for the bait in the customer's minnow bucket.

It is, therefore, one object of this invention to provide a new and improved apparatus for automatically vending live bait.

Another object of this invention is to provide a new and improved apparatus employing means for conveying and dispensing bait to the customers which allows inspection of the bait prior to it being vended.

A further object of this invention is to provide a new and improved apparatus employing means for conveying and dispensing bait to the customers which allows inspection of the bait prior to it being vended.

A further object of this invention is to provide a new and improved bait vending apparatus which is relatively inexpensive to produce, can be reliably operated, is essentially maintenance free and which minimizes injury to the bait during storage and dispensing operations.

Further objects and advantages of the present invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of a housing for a live bait vending apparatus or machine installed in a window or opening of a building for purposes of illustration and embodying the invention;

FIG. 2 is a cross-sectional view of FIG. 1 taken along the line 2—2;

DESCRIPTION OF THE PREFERRED EMBODIMENT

Figure 3:
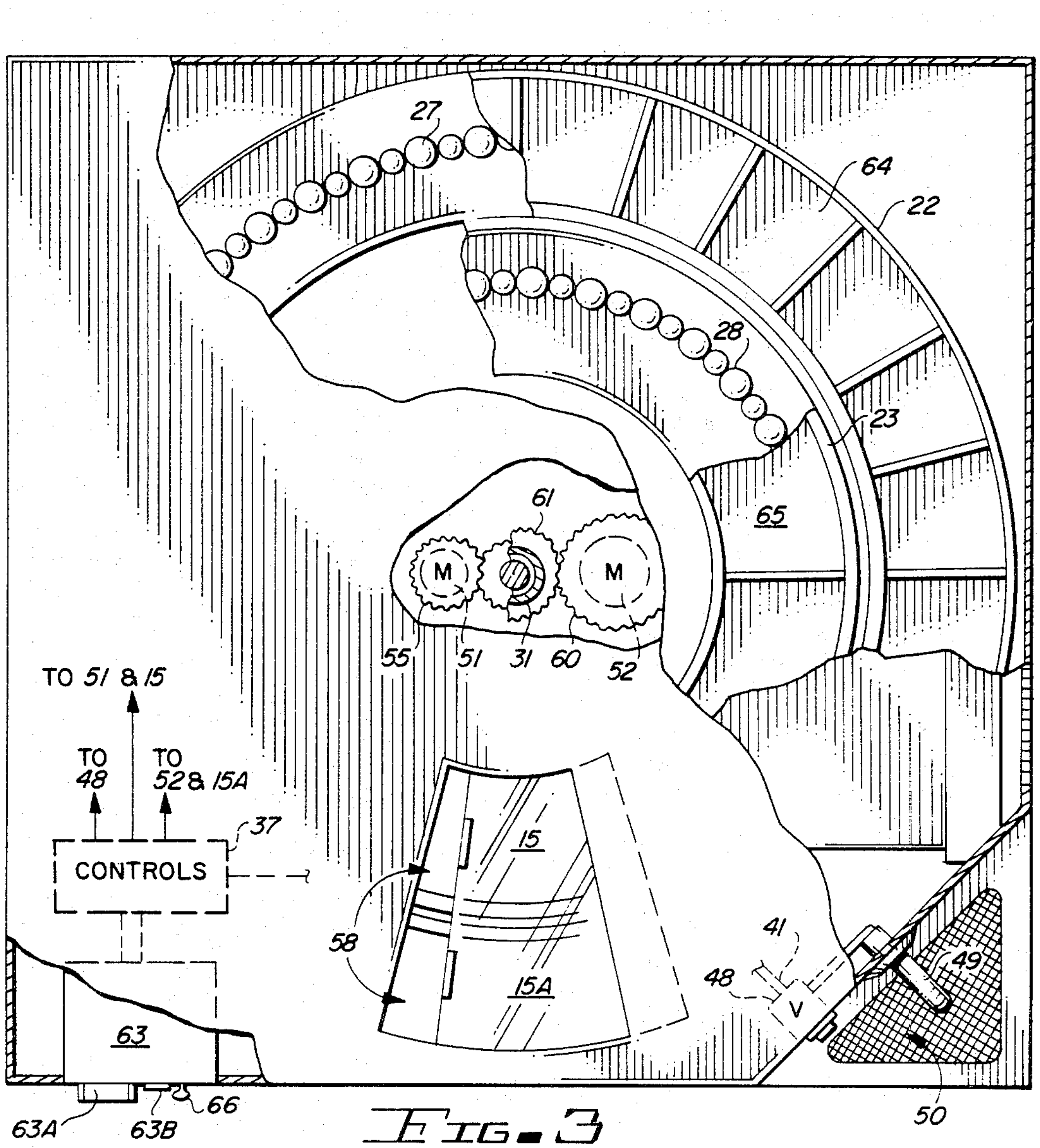
FIG. 3 is a cross-sectional view of FIG. 1 taken along the line 3—3.

Referring more particularly to the drawings by characters of reference, FIG. 1 discloses a live bait vending machine or apparatus 10 incorporating the features of the invention comprising an enclosure or housing 11. Housing 11 comprises front and rear panels 12 and 12A, top and bottom panels 13 and 13A and side panels 14 and 14A.

Top panel 13 may include viewing windows 58, shown in FIG. 3 and a pair of transparent slidable windows 15, 15A all of which may be covered by a hingedly mounted cover 16.

It should be noted that when the term live bait and minnows are used, it is intended that the term used cover any aquatic animal for fishing purposes and hereinafter the term minnows will be used for simplicity purposes.

As noted from FIG. 1, housing 11 may be moved into an opening 17 in a building 18 for after hours sales or may be maintained in or out of the building as so desired.

FIG. 2 illustrates that the housing may comprise top and bottom sections 19 and 20 with the top section comprising a carrousel means 21 and the bottom section comprising a compartment for the control equipment of the apparatus.

The carrousel means comprises two coaxially mounted circular ring-like tanks 22 and 23, each mounted on circular bases 24 and 25, respectively. These tanks are rotatable on or about an axis or support shaft 26 centrally mounted in section 19 of the housing 11. Each tank is further independently rotatable relative to each other by suitable ball bearing arrangements 27, 28 mounted between bases 24 and 25 of tanks 22, 23 and plates 29 and 30. Plates 29 and 30 are fixedly secured to a collar or sleeve 31 which is rotatable about axis 26 by motor means 32 mounted in section 20 of housing 11 as shown in FIG. 2.

Section 19 including tanks 22 and 23 contain water 33 which is cooled, filtered, aerated and continuously recirculated therethrough by a water conditioning apparatus. This apparatus comprises a pump 34, chilled water generating tank and storage means 35, filter 36 and control means 37 all arranged in a closed fluid system. The water content of the system is supplemented for water drained from the system by the purchaser through a water input means 38 and valves 39 and 40 from a source of water under pressure such as a city water supply. In some instances, the supplemented water may be directly supplied from a lake, ocean or pond and then it may or may not be chilled.

It should be noted that the chilled water generating tank and storage means 35 comprises an evaporator and compressor, a temperature probe 35B in a chilled water storage tank 35C and a heat exchanger including a grill 35D all well known in the art.

As noted from FIG. 2, the aerated cooled and filtered water recirculating means comprises an outlet pipe 41 interconnecting pump 34 with a manifold 44 and inlet pipes 42 and 43 which feed water from manifold 44 into the tops of ring-like tanks 22 and 23, respectively at the top of section 19 of the housing.

Water in section 19 is drained from the bottom of section 19 through a drain port 45 formed in plate 29, through a drain pipe 46, filter 36, the chilled water generating means 35 and through pipe 47 to pump 34.

The outlet pipe 41 is also connected to a time controlled customer actuated valve 48 which controls the flow of water from section 19 through an outlet pipe 49 located outside of housing 11 in an alcove or recessed section 50 of housing 11 for the convenience of the customer in filling his minnow bucket with the same water in which the minnows purchased have been stored in.

As noted from FIGS. 2 and 3, motor means 32 comprises two motors 51 and 52, each independently energized to separately rotate tanks 22 and 23 through a gear means 53. As shown, a drive shaft 54 of motor 51 drives a gear 55 axially mounted thereon which is in meshing engagement with a gear 56 which is axially mounted on axis 26 for rotation of tank 23.

Motor 52 is provided with a drive shaft 59 which drives a gear 60 which is in meshing engagement with a gear 61 which is fixedly attached to one end of sleeve 31 for rotating tank 22. Thus, motors 51 and 52 can rotate tanks 22 and 23 in section 19 of housing 11 independently of each other.

Figure 4:
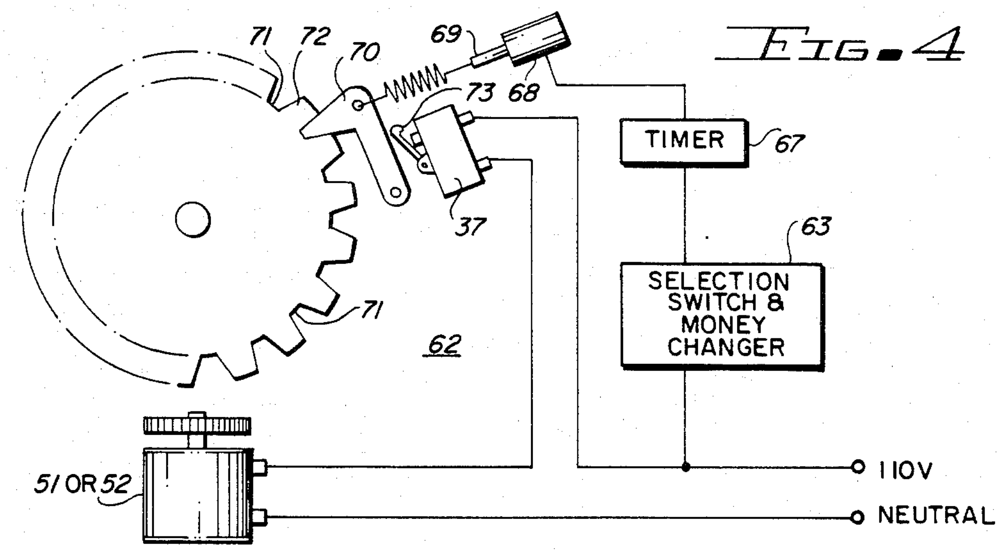
FIG. 4 is a diagrammatic illustration of the coin actuated dispensing structure.

The apparatus disclosed includes an automatic control system 62 for the dispensing system shown diagrammatically in FIG. 4 which includes a selection switch and money changer 63 which receives money such as, for example, one and five dollar bills in slot 63A or coins in slot 63B, makes change if necessary, returns change in coins through slot 63C and then permits the purchaser to select the bait seen through the viewing windows 58. By actuating an associated selector switch 66 to one position or another one of the compartments 64 and 65 of tanks 22 and 23, respectively will be moved underneath the associated slidable window 15 or 15A.

The selection switch and money maker 63 when energized by the placing of the proper money in it and the predetermined actuation of selector switch 66 actuates a timer 67 forming a part of the selector switch and money maker 63. This action energizes a solenoid 68, shown in FIG. 4 associated with solenoid arm 69 which retracts a ratchet arm 70 from a slot 71 in the ratchet wheel 72. The movement of ratchet arm 70 from an associated slot 71 in ratchet wheel 72 closes switch 73 which energizes one of the stepping motors 51 and 52 which moves through associated gears 25 the selected tank and one of its compartments seen through the viewing window 58 to a position underneath one of the sliding windows 15 and 15A.

The selector switch 66 through controls 37 unlocks the selected sliding window 15 or 15A by energizing a suitable means such as a well known solenoid type of lock (not shown) which exposes the selected compartment of one of the tanks 22 and 23 and its bait to the purchaser.

The minnows, for example, are dipped out with a dip net and placed in the purchaser's minnow box (not shown) which is filled or being filled with water from outlet pipe 49. The solenoid 48 is at this time also energized by controls 37.

After a reasonable predetermined time lapse, timer 67 deenergizes which in turn deenergizes controls 37. At this time, solenoid valve 48 closes off water flow from outlet pipe 49 and the selected sliding window 15 or 15A closes under a separate suitable spring biasing means or through a biasing means of the associated solenoid lock.

The apparatus is now ready for another purchaser's effort and tank indexing action.

It should be noted that the apparatus can be made of any suitable material such as plastics or steel and used for fresh or salt water bait. Further, the inlet water may be connected to a fresh or salt water source of water under pressure.

Still further, the well known water leveling equipment may be associated with tanks 22 and 23 to maintain water therein at a given level.

A novel apparatus is disclosed which may function on a 24-hour basis, if desired, for dispensing bait which is periodically loaded into the apparatus.

Although the carrousel is shown as comprising two ring-like coaxially mounted tanks, it could comprise only one circular compartmentized tank or three or more coaxially mounted tanks and fall within the scope of this invention.

An effective, efficient and inexpensive means is thus provided for automatically dispensing bait in accordance with the stated objects of the invention. Although but a single embodiment of the invention has been illustrated and described, it will be apparent to those skilled in the art that various changes and modifications may be made therein without departing from the spirit of the invention or from the scope of the appended claims.

What is claimed is:

1. An apparatus for vending live fishing bait such as minnows comprising:

a housing comprising two sections, an elongated support shaft journaled in said housing to extend within one of said sections and rotatably driven by a motor means mounted in the other section, a carrousel means mounted around said support shaft for rotatable movement thereby, said carrousel means comprising a ring-like circular tank divided into a plurality of sequentially positioned compartments extending around said tank, said one of said sections containing water which substantially fills said tank, means mounted in the other of said sections in fluid communication with said one of said sections to aerate, filter and maintain the temperature condition of the water in said one of said sections, said means to aerate, filter and maintain the temperature includes a valve controlled outlet for dispensing in a time controlled manner water from said one section to outside of said housing and into a minnow bucket of a purchaser of said bait, said housing comprising means for viewing bait in at least one of said compartments and exposing and removing the bait observed in said one of said compartments when said apparatus is actuated, and a money controlled means for rotatably indexing said carrousel means to successivelv register a compartment with said means for viewing and exposing said bait for removal of the bait observed from the apparatus.

2. The apparatus set forth in claim 1 wherein:

said means for viewing bait in at least one of said compartments and exposing and removing the bait observed comprises a viewing window for observing the bait, and a sliding window juxtapositioned to said viewing window for use in exposing and removing the bait observed when the apparatus is moved to align said one of said compartments with said viewing window.

3. The apparatus set forth in claim 2 in further combination with:

motor means for rotating said carrousel means upon energization of said money controlled means.

4. An apparatus for vending live fishing bait such as minnows comprising:

a housing comprising two sections, an elongated shaft journaled in said housing to extend within one of said sections, carrousel means mounted around said support shaft in one of said sections, said carrousel means comprising at least two coaxially mounted ring-shaped tanks, each of said tanks being divided into sequentially positioned compartments extending around the tank, said one of said sections containing water at a level substantially equal to that filling said tanks, motor means comprising a pair of independently operable motors for rotating said carrousel means, one of said tanks being connected to said shaft for rotation by one of said motors, the other of said tanks being connected to the other of said motors and journaled for rotation about said shaft, means mounted in the other of said sections in fluid communication with said one of said sections to aerate, filter and maintain the temperature condition of the water in said one of said sections and in said tanks, said housing comprising a viewing and exposing window means for observing the live bait in at least one of said compartments of each of said tanks and for removing the bait observed in either of said compartments when the apparatus is actuated to move and align said one of said compartments with said window means, and a money controlled means for selectively energizing one of said motors for selectively rotating a given one of said tanks of said carrousel means to successively register a compartment in one of said tanks with said window means.

5. An apparatus for vending live fishing bait such as minnows comprising:

a housing comprising two sections, an elongated shaft journaled in said housing to extend within one of said sections, carrousel means mounted around said support shaft in one of said sections, said carrousel means comprising at least two coaxially mounted ring-shaped tanks, each of said tanks being divided into sequentially positioned compartments extending around the tank, said one of said sections containing water at a level substantially equal to that filling said tanks, motor means comprising a pair of independently operable motors for rotating said carrousel means, one of said tanks being connected to said shaft for rotation by one of said motors, the other of said tanks being connected to the other of said motors and journaled for rotation about said shaft, means mounted in the other of said sections in fluid communication with said one of said sections to aerate, filter and maintain the temperature condition of the water in said one of said sections and in said tanks, said means to aerate, filter and maintain the temperature including a valve controlled outlet for dispensing in a time controlled manner water from said one section to outside of said housing and into a minnow bucket of a purchaser, said housing comprising a viewing window means for observing the live bait in at least one of said compartments of each of said tanks and a sliding window means comprising two portions juxtapositioned to said viewing window for use in exposing and removing the bait observed in either of said compartments when the apparatus is actuated to move and align said one of said compartments with one portion of said sliding window means, and a money controlled means for selectively energizing one of said motors for selectively rotating a given one of said tanks of said carrousel means to successively register a compartment in said one of said tanks with one of said portions of said sliding window means for removal of the bait observed.

* * * * *